(12) United States Patent
Liu

(10) Patent No.: US 10,785,356 B2
(45) Date of Patent: Sep. 22, 2020

(54) DISPLAY SCREEN ASSEMBLY AND MOBILE TERMINAL

(71) Applicants: Chengdu BOE Optoelectronics Technology Co., Ltd., Chengdu, Sichuan Province (CN); BOE Technology Group Co., Ltd., Beijing (CN)

(72) Inventor: Guo Liu, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/524,277

(22) Filed: Jul. 29, 2019

(65) Prior Publication Data

US 2020/0220957 A1 Jul. 9, 2020

(30) Foreign Application Priority Data

Jan. 3, 2019 (CN) .......................... 2019 1 0004595

(51) Int. Cl.
*H04M 1/02* (2006.01)
(52) U.S. Cl.
CPC ....... *H04M 1/0266* (2013.01); *H04M 1/0233* (2013.01); *H04M 1/0264* (2013.01)

(58) Field of Classification Search
CPC . H04M 1/0266; H04M 1/0264; H04M 1/0233
See application file for complete search history.

(56) References Cited

U.S. PATENT DOCUMENTS

| | | | |
|---|---|---|---|
| 2012/0256896 A1* | 10/2012 | Yamazaki | ................ G09G 3/20 345/211 |
| 2016/0286119 A1* | 9/2016 | Rondinelli | ........... H04N 5/2254 |
| 2019/0007620 A1* | 1/2019 | Lei | ...................... H04M 1/0264 |

* cited by examiner

*Primary Examiner* — Chuong A Ngo
(74) *Attorney, Agent, or Firm* — Arent Fox LLP; Michael Fainberg

(57) ABSTRACT

The disclosure relates to the field of electronic devices, and discloses a display screen assembly and a mobile terminal, and the display screen assembly includes a primary screen, wherein the primary screen includes a transparent area, and a driving component, a camera, and a secondary screen arranged on a side of the primary screen away from a light exit face, wherein the driving component is configured to drive the camera and the secondary screen to be alternately arranged facing the transparent area. In the display screen assembly, the driving component drives the camera to face the transparent area to thereby take a picture, and drives the secondary screen to face the transparent area after the picture is taken, so that the camera is hidden below the primary screen.

18 Claims, 3 Drawing Sheets

DISPLAY SCREEN ASSEMBLY AND MOBILE TERMINAL

CROSS-REFERENCE TO RELATED APPLICATION

This application claims the priority of Chinese Patent Application No. 201910004595.0, filed with the Chinese Patent Office on Jan. 3, 2019, the content of which is hereby incorporated by reference in its entirety.

FIELD

The present disclosure relates to the field of electronic device technologies, and particularly to a display screen assembly and a mobile terminal.

BACKGROUND

As smart mobile phones are advancing rapidly, display screens of the mobile phones are larger and larger, and there is such a bottleneck of the size of a display screen, various dominating mobile phone manufactures are striving for the all-screen technologies so as to provide their mobile phones with a better visual effect.

The existing all-screen mobile phones emerging in the market generally include bang-like screens, widow's peak-like screens, etc., that is, some area is still reserved on a primary screen for installing a camera, so the all-screen design still has improve space and user experience needs to be improved.

SUMMARY

The embodiments of the disclosure disclose a display screen assembly and a mobile terminal.

In one aspect, an embodiment of the disclosure provides a display screen assembly including a primary screen, wherein the primary screen includes: a transparent area, and a driving component, a camera, and a secondary screen on a side of the primary screen away from the light exit face;

wherein the driving component is configured to drive the camera and the secondary screen to be alternately arranged facing the transparent area.

In the display screen assembly above, the driving component can drive the camera and the secondary screen to alternately face the transparent area, that is, the driving component drives the camera to face the transparent area to thereby take a picture, and drives the secondary screen to face the transparent area after the picture is taken, so that the camera is hidden below the primary screen, thus displaying the picture all over the screen.

Optionally, the camera is fixed relative to the secondary screen, and both the camera and the secondary screen are driven by the driving component.

Optionally, the driving component is configured to drive the camera and the secondary screen into rotation around an axis perpendicular to the primary screen.

Optionally, the driving component includes a driving shaft perpendicular to the primary screen, and both the camera and the secondary screen are fixed relative to the driving shaft.

Optionally, the driving component is configured to drive the camera and the secondary screen into translation on a plane parallel to the primary screen.

Optionally, the camera and the secondary screen are separated from each other, and are driven respectively by respective driving components.

Optionally, the transparent area is formed in a hollow structure.

Optionally, a transparent filler layer is filled in the hollow structure.

Optionally, the transparent filler layer includes a polyimide layer.

Optionally, in the condition that the camera is arranged facing the transparent area, an orthographic projection of the camera onto a plane where the primary screen lies at least partially overlaps with an orthographic projection of the transparent area onto the plane where the primary screen lies;

in the condition that the secondary screen is arranged facing the transparent area, n orthographic projection of the secondary screen onto the plane where the primary screen lies substantially overlaps with an orthographic projection of the transparent area onto the plane where the primary screen lies.

In another aspect, an embodiment of the disclosure further provides a mobile terminal including a display screen assembly including a primary screen, wherein the primary screen comprises: a transparent area, and a driving component, a camera, and a secondary screen on a side of the primary screen away from a light exit face;

wherein the driving component is configured to drive the camera and the secondary screen to be alternately arranged facing the transparent area.

Optionally, the camera is fixed relative to the secondary screen, and both the camera and the secondary screen are driven by the driving component.

Optionally, the driving component is configured to drive the camera and the secondary screen into rotation around an axis perpendicular to the primary screen.

Optionally, the driving component comprises a driving shaft perpendicular to the primary screen, and both the camera and the secondary screen are fixed relative to the driving shaft.

Optionally, the driving component is configured to drive the camera and the secondary screen into translation on a plane parallel to the primary screen.

Optionally, the camera and the secondary screen are separated from each other, and are driven respectively by respective driving components.

Optionally, the transparent area is formed in a hollow structure.

Optionally, a transparent filler layer is filled in the hollow structure.

Optionally, wherein the transparent filler layer comprises a polyimide layer.

Optionally, in the condition that the camera is arranged facing the transparent area, an orthographic projection of the camera onto a plane where the primary screen lies at least partially overlaps with an orthographic projection of the transparent area onto the plane where the primary screen lies;

in the condition that the secondary screen is arranged facing the transparent area, n orthographic projection of the secondary screen onto the plane where the primary screen lies substantially overlaps with an orthographic projection of the transparent area onto the plane where the primary screen lies.

BRIEF DESCRIPTION OF THE DRAWINGS

In order to more clearly illustrate the technical solutions in the embodiments of the present disclosure, the drawings will be briefly described in the description of the embodiments as following, and the drawings in the following description are only some of the embodiments of the present disclosure, and it is obvious for those skilled in the art that other drawings can be obtained from these drawings without paying any creative work.

DETAILED DESCRIPTION OF THE EMBODIMENTS

The technical solutions according to the embodiments of the disclosure will be described below clearly and fully with reference to the drawings in the embodiments of the disclosure. Apparently the embodiments to be described are only a part but all of the embodiments of the disclosure. Based upon the embodiments here of the disclosure, all of other embodiments which can occur to those ordinarily skilled in the art without any inventive effort shall come into the scope of the disclosure as claimed.

Figure 1:
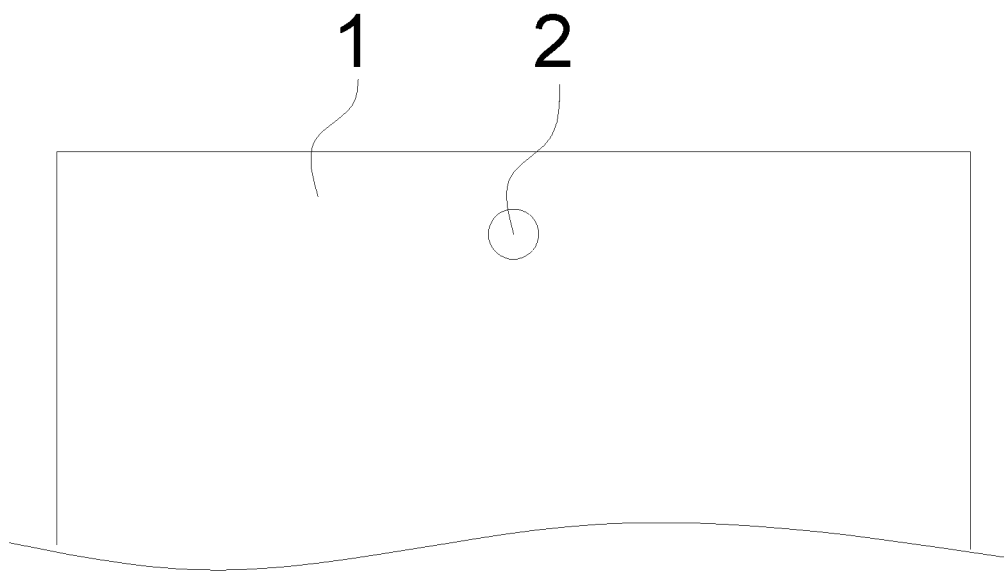
FIG. 1 is a first front view of a display screen assembly according to an embodiment of the disclosure.

As illustrated in FIG. 1, a display screen assembly according to an embodiment of the disclosure includes a primary screen 1, wherein the primary screen includes a transparent area 2, and a driving component, a camera 3, and a secondary screen 4 on a side of the primary screen 1 away from a light exit face, where:

the driving component is configured to drive the camera 3 and the secondary screen 4 to be alternately arranged facing the transparent area 2.

It shall be noted that the shape of the transparent area 2 as referred to in this embodiment can be a round, an ellipse, a polygon (including but not limited to a regular hexagon, a square, or a diamond), or another irregular shape.

The camera 3 and the secondary screen 4 are alternately arranged facing the transparent area 2 particularly as follows.

Firstly, in the condition that the camera 3 is arranged facing the transparent area 2, particularly an orthographic projection of the transparent area 2 onto a plane where the primary screen 1 lies (a first projection hereinafter) at least partially overlaps with an orthographic projection of the camera 3 onto the plane where the primary screen 1 lies (a second projection hereinafter), and for example, the second projection completely lies into the first projection, or a part of the second projection lies into the first projection.

Secondly, in the condition that the secondary screen 4 is arranged facing the transparent area 2, particularly an orthographic projection of the secondary screen 4 onto the plane where the primary screen 1 lies (a third projection hereinafter) substantially overlaps with the first projection, and there is substantially the same shape of the two projections, wherein the substantial overlap between the third projection and the first projection means the error rate is within 10%. For example, the first projection completely lies into the third projection, and the third projection is slightly larger than the first projection, so that the transparent area 2 can be completely covered with the secondary screen 4, and display related information.

In the display screen assembly above, the driving component can drive the camera 3 and the secondary screen 4 to alternatively face the transparent area 2, that is, the driving component drives the camera 3 to face the transparent area 2 to thereby take a picture, and drives the secondary screen 4 to face the transparent area 2 after the picture is taken, so that the camera 3 is hidden below the primary screen 1, thus displaying the picture all over the screen.

In some embodiments, the camera 3 is fixed relative to the secondary screen 4, and both the camera 3 and the secondary screen 4 are driven by the same driving component, thus simplifying the structure of the driving component, and saving a space in a mobile terminal, where the camera 3 can be connected directly with the secondary screen 4, or, they can be connected respectively with the driving component thus connected with each other indirectly.

It shall be noted that "the camera 3 is fixed relative to the secondary screen 4" particularly refers as follows: the camera 3 remains a synchronous motion trend with the secondary screen 4, that is, there is the same motion parameter, e.g., motion direction, motion speed, etc., of the camera 3 as the secondary screen 4; and particularly the camera 3 can be fixedly connected directly with the secondary screen 4, or both the camera 3 and the secondary screen 4 can be connected with one or more components (e.g., a driving shaft 5 or another connection component).

Where, there may be a number of motion patterns of the camera 3 and the secondary screen 4, examples of which will be given below.

In a first motion pattern, the driving component is configured to drive the camera 3 and the secondary screen 4 into rotation around an axis perpendicular to the primary screen 1.

Figure 2:
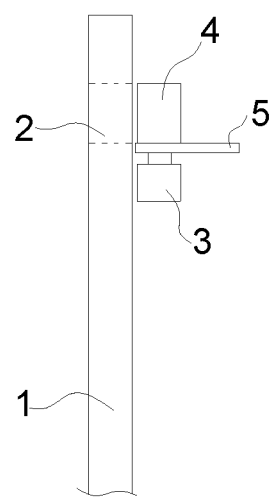
FIG. 2 is a side view of the display screen assembly according to the embodiment of the disclosure.

As illustrated in FIG. 2, the driving component includes a driving shaft 5 perpendicular to the primary screen 1, and both the camera 3 and the secondary screen 4 are fixed relative to the driving shaft 5, where the driving shaft 5 can be driven by a micro-motor; and in another example, both the camera 3 and the secondary screen 4 are arranged on a rotating disk driven by a micro-motor.

Figure 3:
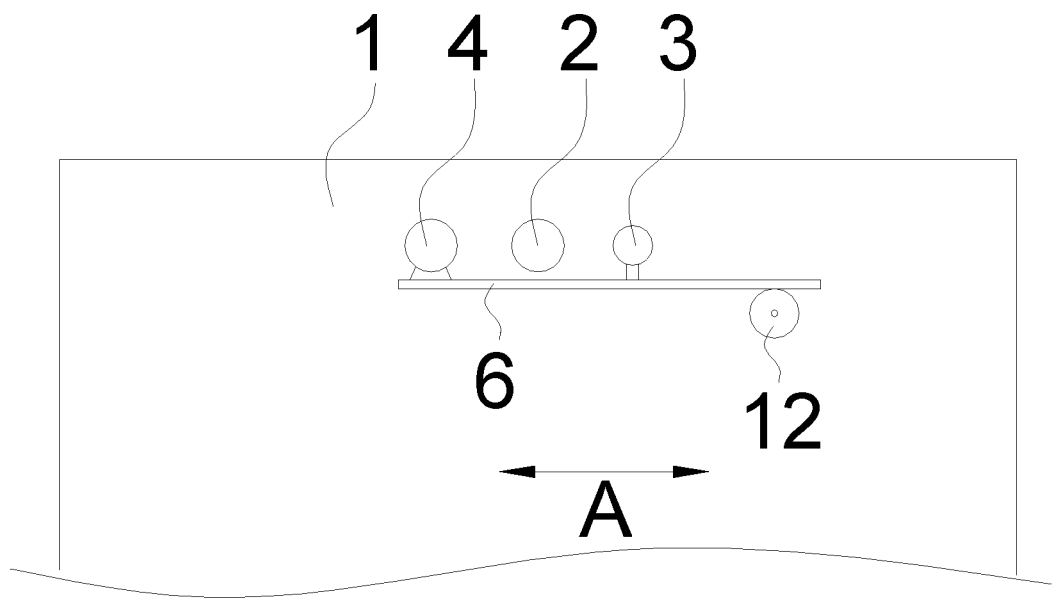
FIG. 3 is a first back view of the display screen assembly according to the embodiment of the disclosure.

In a second motion pattern, the driving component is configured to drive the camera 3 and the secondary screen 4 into translation on a plane parallel to the primary screen 1, and as illustrated in FIG. 3, both the camera 3 and the secondary screen 4 are driven back and forth on a straight line by the same straight driving piece, where the straight driving piece can be a first gear strip 6 driven by a first gear 12 into telescopic motion, the camera 3 and the secondary screen 4 are brought by the first gear strip 6 into left-right motion in the direction A so that the camera 3 and the secondary screen 4 are alternately arranged facing the transparent area 2 as needed, and the transmission gear can be driven by a micro-motor or others so that the camera 3 and the secondary screen 4 are alternately arranged facing the transparent area 2 as needed.

In some embodiments, the camera 3 and the secondary screen 4 are separated from each other, and are driven respectively by respective driving components.

Figure 4:
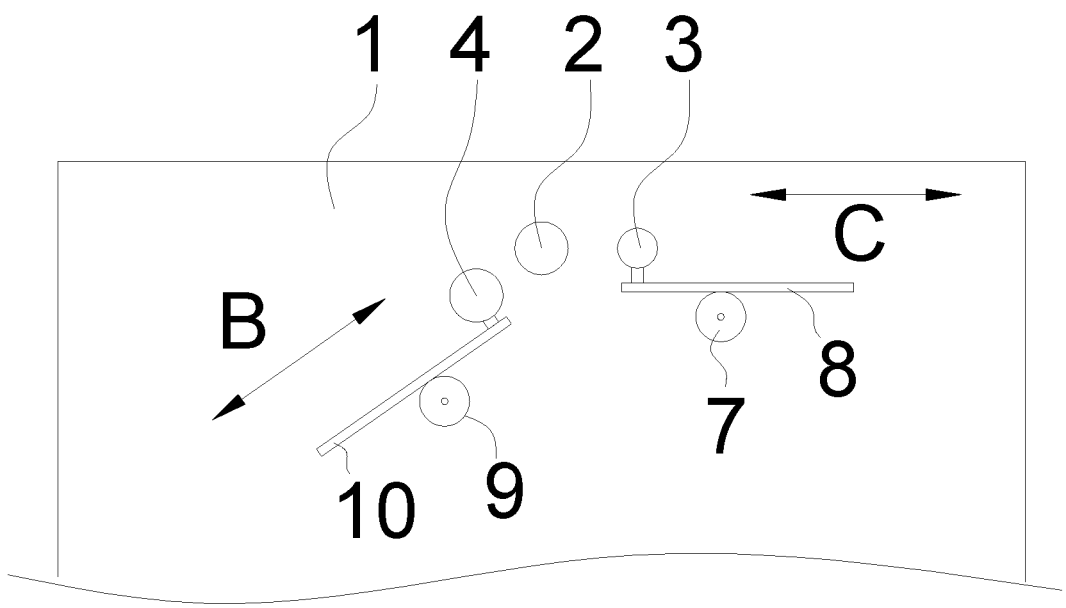
FIG. 4 is a second back view of the display screen assembly according to the embodiment of the disclosure.

Particularly as illustrated in FIG. 4, for example, the camera 3 is driven by a second gear strip 8 into back-and-forth motion as needed in the direction C, where the second gear strip 8 is brought by a second gear 7 into motion; and the secondary screen 4 is driven by a third gear strip 10 into back-and-forth motion as needed in the direction B, where the third gear strip 10 is driven by a third gear 9, so that, the camera 3 and the secondary screen 4 are alternately arranged facing the transparent area 2 as needed. As can be appreciated, the camera 3 and the secondary screen 4 can alternatively be driven by a rotating shaft or otherwise as long as the camera 3 and the secondary screen 4 are alternately arranged facing the transparent area 2.

Optionally, the transparent area 2 is formed in a hollow structure to thereby maintain the original color of the secondary screen 4 instead of changing the display color thereof due to a layer in the transparent area 2.

Figure 5:
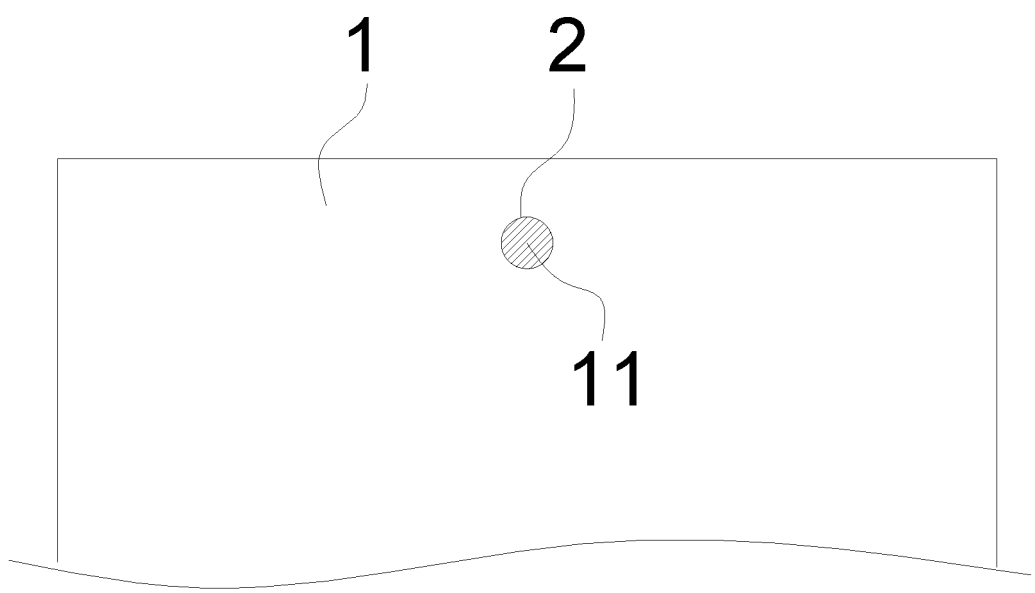
FIG. 5 is a second front view of the display screen assembly according to the embodiment of the disclosure.

Optionally, as illustrated in FIG. 5, a transparent filler layer 11 is filled in the hollow structure so that in a condition that a cover plate is attached on the surface of the primary screen 1, the transparent filler layer 11 can support the cover plate to thereby prevent the cover plate from being damaged, so as to improve the mechanical strength of the cover plate.

Where, the transparent filler layer 11 includes a polyimide layer.

A mobile terminal according to an embodiment of the disclosure includes the display screen assembly according to the embodiment above.

In the mobile terminal above, the driving component can drive the camera 3 and the secondary screen 4 to alternatively face the transparent area 2, that is, the driving component drives the camera 3 to face the transparent area 2 to thereby take a picture, and drives the secondary screen 4 to face the transparent area 2 after the picture is taken, so that the camera 3 is hidden below the primary screen 1, thus displaying the picture all over the screen.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A display screen assembly, comprising a primary screen, wherein the primary screen comprises: a transparent area, and a driving component, a camera, and a secondary screen on a side of the primary screen away from a light exit face;
wherein the driving component is configured to drive the camera and the secondary screen to be alternately arranged facing the transparent area;
wherein:
in the condition that the camera is arranged facing the transparent area, an orthographic projection of the camera onto a plane where the primary screen lies at least partially overlaps with an orthographic projection of the transparent area onto the plane where the primary screen lies;
in the condition that the secondary screen is arranged facing the transparent area, an orthographic projection of the secondary screen onto the plane where the primary screen lies substantially overlaps with an orthographic projection of the transparent area onto the plane where the primary screen lies.

2. The display screen assembly according to claim 1, wherein the camera is fixed relative to the secondary screen, and both the camera and the secondary screen are driven by the driving component.

3. The display screen assembly according to claim 2, wherein the driving component is configured to drive the camera and the secondary screen into rotation around an axis perpendicular to the primary screen.

4. The display screen assembly according to claim 3, wherein the driving component comprises a driving shaft perpendicular to the primary screen, and both the camera and the secondary screen are fixed relative to the driving shaft.

5. The display screen assembly according to claim 2, wherein the driving component is configured to drive the camera and the secondary screen into translation on a plane parallel to the primary screen.

6. The display screen assembly according to claim 1, wherein the camera and the secondary screen are separated from each other, and are driven respectively by respective driving components.

7. The display screen assembly according to claim 1, wherein the transparent area is formed in a hollow structure.

8. The display screen assembly according to claim 7, wherein a transparent filler layer is filled in the hollow structure.

9. The display screen assembly according to claim 8, wherein the transparent filler layer comprises a polyimide layer.

10. A mobile terminal, comprising the display screen assembly comprising a primary screen, wherein the primary screen comprises: a transparent area, and a driving component, a camera, and a secondary screen on a side of the primary screen away from a light exit face;
wherein the driving component is configured to drive the camera and the secondary screen to be alternately arranged facing the transparent area;
wherein:
in the condition that the camera is arranged facing the transparent area, an orthographic projection of the camera onto a plane where the primary screen lies at least partially overlaps with an orthographic projection of the transparent area onto the plane where the primary screen lies;
in the condition that the secondary screen is arranged facing the transparent area, an orthographic projection of the secondary screen onto the plane where the primary screen lies substantially overlaps with an orthographic projection of the transparent area onto the plane where the primary screen lies.

11. The mobile terminal according to claim 10, wherein the camera is fixed relative to the secondary screen, and both the camera and the secondary screen are driven by the driving component.

12. The mobile terminal according to claim 11, wherein the driving component is configured to drive the camera and the secondary screen into rotation around an axis perpendicular to the primary screen.

13. The mobile terminal according to claim 12, wherein the driving component comprises a driving shaft perpendicular to the primary screen, and both the camera and the secondary screen are fixed relative to the driving shaft.

14. The mobile terminal according to claim 11, wherein the driving component is configured to drive the camera and the secondary screen into translation on a plane parallel to the primary screen.

15. The mobile terminal according to claim 10, wherein the camera and the secondary screen are separated from each other, and are driven respectively by respective driving components.

16. The display screen assembly according to claim 10, wherein the transparent area is formed in a hollow structure.

17. The mobile terminal according to claim 16, wherein a transparent filler layer is filled in the hollow structure.

18. The mobile terminal according to claim 17, wherein the transparent filler layer comprises a polyimide layer.

\* \* \* \* \*